July 22, 1969   G. W. GRAY   3,457,547
VEHICLE DETECTOR
Filed Aug. 1, 1966
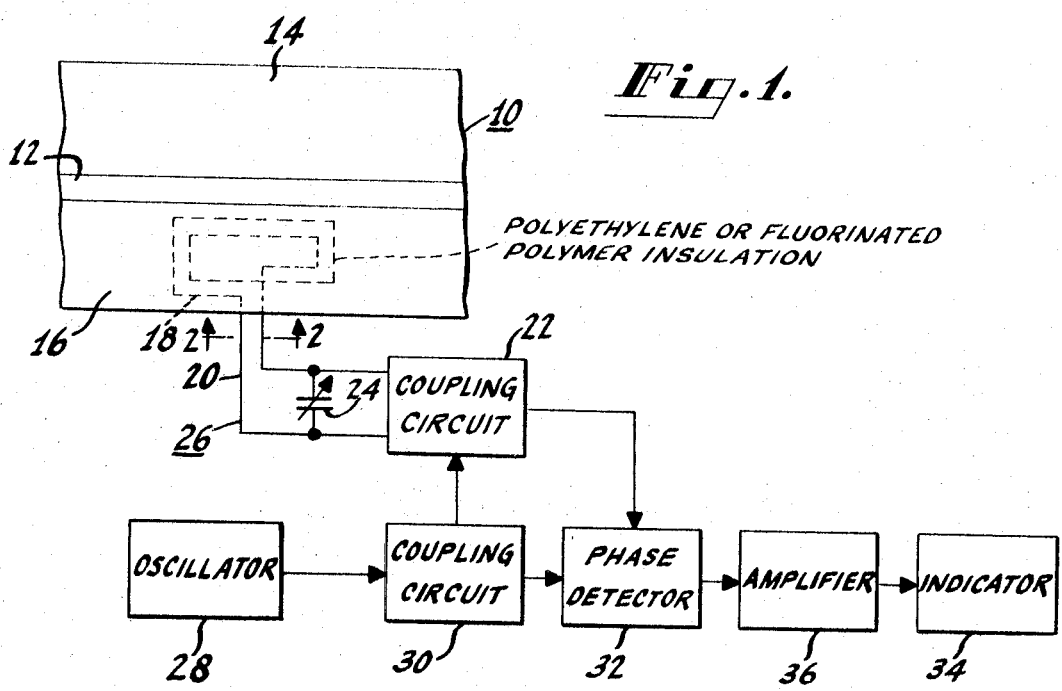
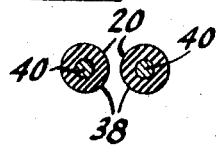
INVENTOR.
GEORGE W. GRAY
BY
Simon Yaffee
Attorney

United States Patent Office 3,457,547
Patented July 22, 1969

3,457,547
VEHICLE DETECTOR
George W. Gray, Lambertville, N.J., assignor to RCA Corporation, a corporation of Delaware
Filed Aug. 1, 1966, Ser. No. 569,418
Int. Cl. G08g 1/01; H01f 15/16
U.S. Cl. 340—38                                  5 Claims This invention relates to vehicle detectors of the type in which the tuning of a vehicle detecting tuned circuit is varied by a vehicle moving into the vicinity of the vehicle detecting inductive loop comprising part of the tuned circuit.

In detecting the presence of a vehicle by means of a loop, the change of inductance of the loop when a vehicle moves into the vicinity thereof causes a change in tuning of the vehicle detecting tuned circuit including the loop. This change in tuning may be in the order of one tentth of one percent. Means are provided to respond to the effect of this change in tuning to indicate the presence of a vehicle.

The capacity of a vehicle detecting tuned circuit comprises the distributed capacity of the loop itself, the capacity of a capacitor connected across the loop through lead-in wires and the distributed capacity of the lead-in wires. The greater part of the capacity of the tuned-circuit may be the distributed capacity of the lead-in wires. In prior art vehicle detectors, the distributed capacity of the lead-in wires may vary as much as one percent as the temperature thereof varies one degree C., which causes a relatively large change in the tuning of the tuned circuit. This large change in tuning may conceal or make difficult the detection of the change in the tuning of the tuned circuit due to the presence of a vehicle. For proper operation of such a prior art vehicle detector, provision is made for the compensation of the change in tuning of the tuned circuit due to temperature changes.

It is an object of this invention to provide an improved vehicle detector.

It is a further object of this invention to provide an improved vehicle detector in which means are provided to minimize the changes of tuning of the tuned circuit thereof due to temperature changes.

In accordance with this invention, the lead-in wires to the loop are insulated by an insulator having low change in specific inductive capacity or permittivity with change in temperature. A suitable insulator for these wires is polyethylene or a fluorinated polymer such as Teflon. It has been found that the greater part of the change in tuning of the vehicle detector tuned circuit with change in temperature is due to changes in the distributed capacity between the lead-in wires to the loop, and that the change of the length thereof with change of temperature is of minor importance. By using polyethylene or a fluorinated polymer as insulation on the lead-in wires to the detecting loop, the change in capacity between the leads due to temperature changes thereof has been reduced about a hundred fold. In a vehicle detector made in accordance with this invention, the ratio of the change in tuning due to the presence of a vehicle in or near the detecting loop to the change in tuning due to change in temperature is increased many times, resulting in a better vehicle detector, or, conversely, permitting the producing of a vehicle detector which is as good as the prior art vehicle detector employing, however, a more economical design.

The invention will be better understood upon reading the following explanation thereof in connection with the accomapnying drawing in which:

FIGURE 1 is a circuit diagram of a vehicle detector embodying this invention, and FIGURE 2 is a cross section at line 2—2 of FIGURE 1 of the lead-in wires to the detecting loop of the vehicle detector of FIGURE 1.

In FIGURE 1, a roadway is indicated by the reference character 10. A traffic lane divider 12 may be provided along the middle of the roadway separating the roadway into two lanes 14 and 16. A vehicle detecting loop 18 may be buried in a selected position along lane 16. The loop 18 is connected as by lead-in wires 20 to a coupling circuit 22, a variable capacitor 24 being connected across the lead-in wires 20 to form with the loop 18 and the lead-in wires 20 a vehicle detecting tuned circuit 26. The vehicle detecting tuned circuit 26 is connected to the coupling circuit 22 to which an oscillator 28 is also connected through a second coupling circuit 30. The output of the two coupling circiuts 22 and 30 are connected to respective input connections of a phase detector 32 and the output of the phase detector 32 is connected to a vehicle presence indicator 34 through an amplifier 36 if necessary. As shown in FIGURE 2, insulation 38 surrounds the respective copper conductors 40 of the lead-in wires 20. This insulation 38 is of a material having a small change of specific inductive capacity or permittivity with change of temperature. Specific inductive capacity or permittivity of an insulating material is defined as the ratio of the capacity of a capacitor when the space between its plates is filled by the material to the capacity of the capacitor when vacuum exists between the plates. Polyethylene or a fluorinated polymer such as Teflon or the like are suitable for the insulation 38.

The operation of the vehicle detection circuit of FIGURE 1 is as follows: Waves of a frequency produced by the oscillator 28 are applied to the tuned circuit 26 by way of the coupling circiuts 30 and 22 in tandem. The waves produced by the oscillator 28 are also supplied to an input connection of the phase detector 32 through the coupling circuit 30. The tuned circuit 26 modifies the phase of the waves applied thereto in accordance with the change of tuning thereof and the so-modified waves are applied to another input of the phase detector 32 by way of the coupling circuit 22. The output of the phase detector 32 is an electrical voltage or current of a value such that it indicates the difference in phase between the waves applied to the two inputs of the phase detector 32. When a vehicle comes into close proximity of the loop 18 or enters into it, the inductance of the loop 18 and therefore the tuning of the vehicle detecting tuned circuit 26 is changed, modifying the phase of the waves applied thereto and transmitted to the other input of the phase detector 32. The indicator 34 of the described vehicle detector is so adjusted that the indicator 34 indicates an absence of a vehicle when the phase relation between the two inputs to the phase detector is that which results from the absence of a vehicle in or near the loop 18, and the indicator indicates the presence of a vehicle when the phase relation between the waves applied to the two inputs of the phase detector is changed by the presence of a vehicle in or closely adjacent to the loop 18.

When a vehicle comes into the loop 18 or into close vicinity thereof, the inductance of the loop is changed and therefore the tuning of the vehicle detecting tuned circuit 26 is changed by about 1/10 of one percent for the automobile or truck of usual design. The lead-in wires 20 are relatively close together and provide the greater portion of the capacity of the tuned circuit 26. When the usual PVC (polyvinylchloride) insulation is used as insulation for the lead-in wires 20, the capacity between the leads changes as much as one percent per degree C. Since the change in tuning of the tuned circuit due to the presence of a vehicle is less than the change in tuning thereof due to a change in temperature of one degree C. when PVC insulation is used on the lead-in wires 20, the change in tuning due to change in temperature may render the indications of the vehicle detector ambiguous or incorrect, whereby elaborate devices for compensating for capacity changes are required to permit such a vehicle detector correctly to indicate the presence of a vehicle. Upon substituting similar copper lead-in wires comprising however a polyethylene or a fluorinated polymer insulation, instead of the PVC insulation, the change in capacity is reduced one hundred fold to about $1/100$ of one percent per degree C. Using such insulation on the loop lead-in wires, a more accurate vehicle detector is produced or conversely a vehicle detector of more economical design can be produced that is as accurate as prior art detectors.

While a vehicle detector according to this invention has been described, modifications may be made therein by persons skilled in the art. For example, the whole detecting loop 18 as well as the lead-in wires 20 may be made of a conductor having insulation whose specific induction capacity varies but slightly with temperature. Therefore, the above description is to be taken as illustrative and not in a limiting sense.

What is claimed is:

1. A vehicle detector comprising:
   a tuned circuit including a loop, lead-in wires and a tuning capacitor connected in series,
   means responsive to the presence of a vehicle in or in close vicinity to said loop to vary the tuning of said tuned circuit, said tuned circuit also varying in tuning with variations of temperature thereof, and
   means to decrease the variation of tuning of said tuned circuit due to changes of temperature thereof comprising insulation for said lead-in wires having a change in specific inductive capacity of about $1/100$ of one percent per degree C., and
   means responsive to changes in tuning of said tuned circuit to indicate the presence of a vehicle in or in the vicinity of said loop.

2. The invention as described in claim 1 in which said insulation material is polyethylene.

3. The invention as described in claim 1 in which said insulation material is a fluorinated polymer.

4. A vehicle detector comprising
   a vehicle detecting loop, insulated lead-in wires and a capacitor connected in series to provide a vehicle detecting tuned circuit, the presence of a vehicle in or near said loop as well as changes in temperature of said tuned circuit varying the tuning thereof,
   a phase detector having two input connections,
   an oscillator,
   means to apply waves from said oscillator to one input connection of said phase detector,
   means to apply waves from said oscillator to said tuned circuit,
   means to apply waves as modified by said tuned circuit to the other input connection of said phase detector, the change in specific inductive capacity of the insulation of said lead-in wires per degree C. with change in temperature being about $1/100$ of one percent, and
   means responsive to changes in tuning of said tuned circuit to indicate the presence of a vehicle in or near said loop.

5. The invention as described in claim 1 in which said insulation is a polymer chosen from the group of polyethylene polymers and fluorinated polymers.

No references cited.

THOMAS B. HABECKER, Primary Examiner

U.S. Cl. X.R.

331—65, 176; 336—179